Dec. 12, 1933.   R. SAITTA   1,939,228
UNIVERSAL JOINT
Filed July 18, 1932   2 Sheets-Sheet 1
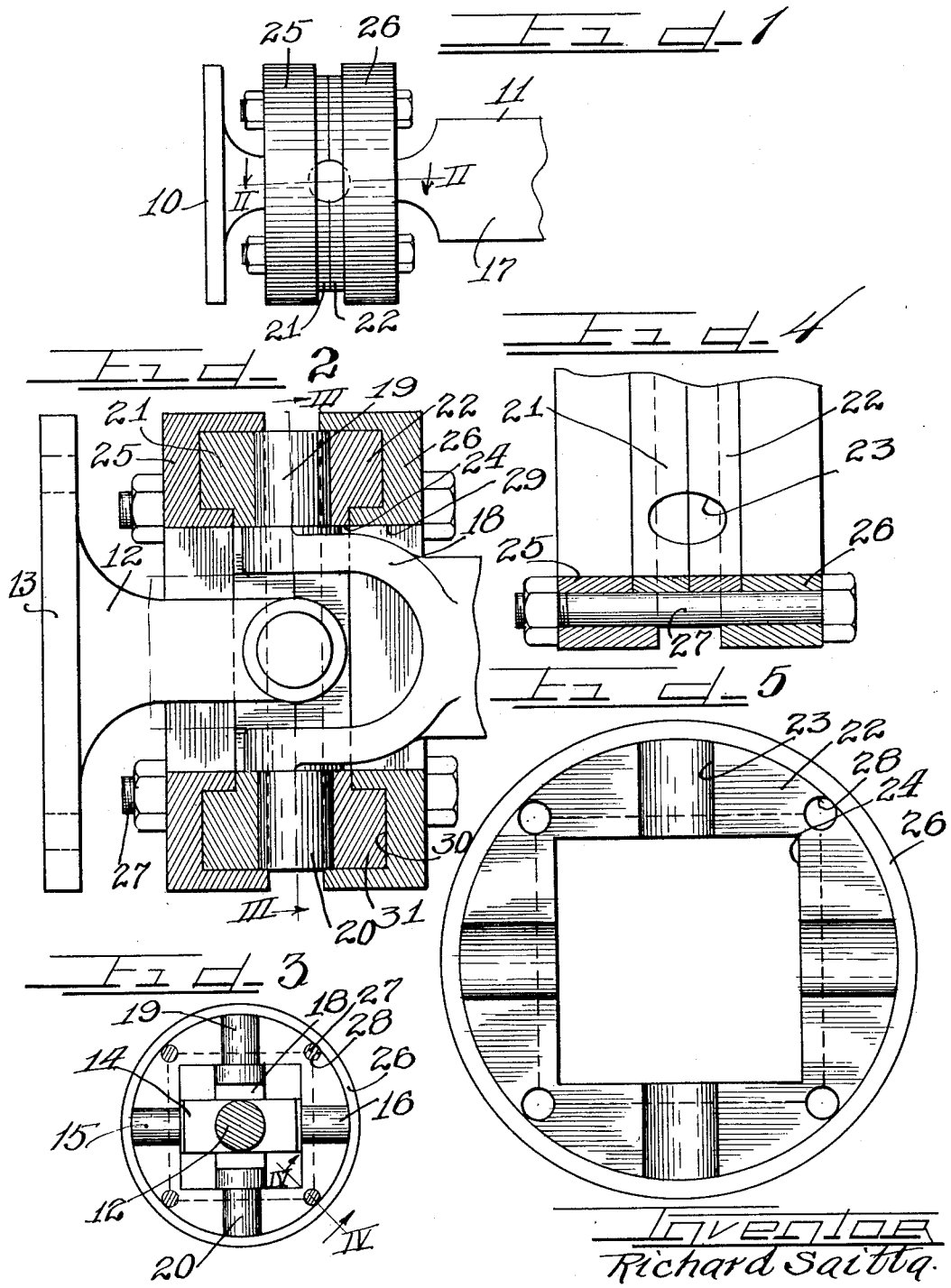

Dec. 12, 1933.  R. SAITTA  1,939,228
UNIVERSAL JOINT
Filed July 18, 1932  2 Sheets-Sheet 2
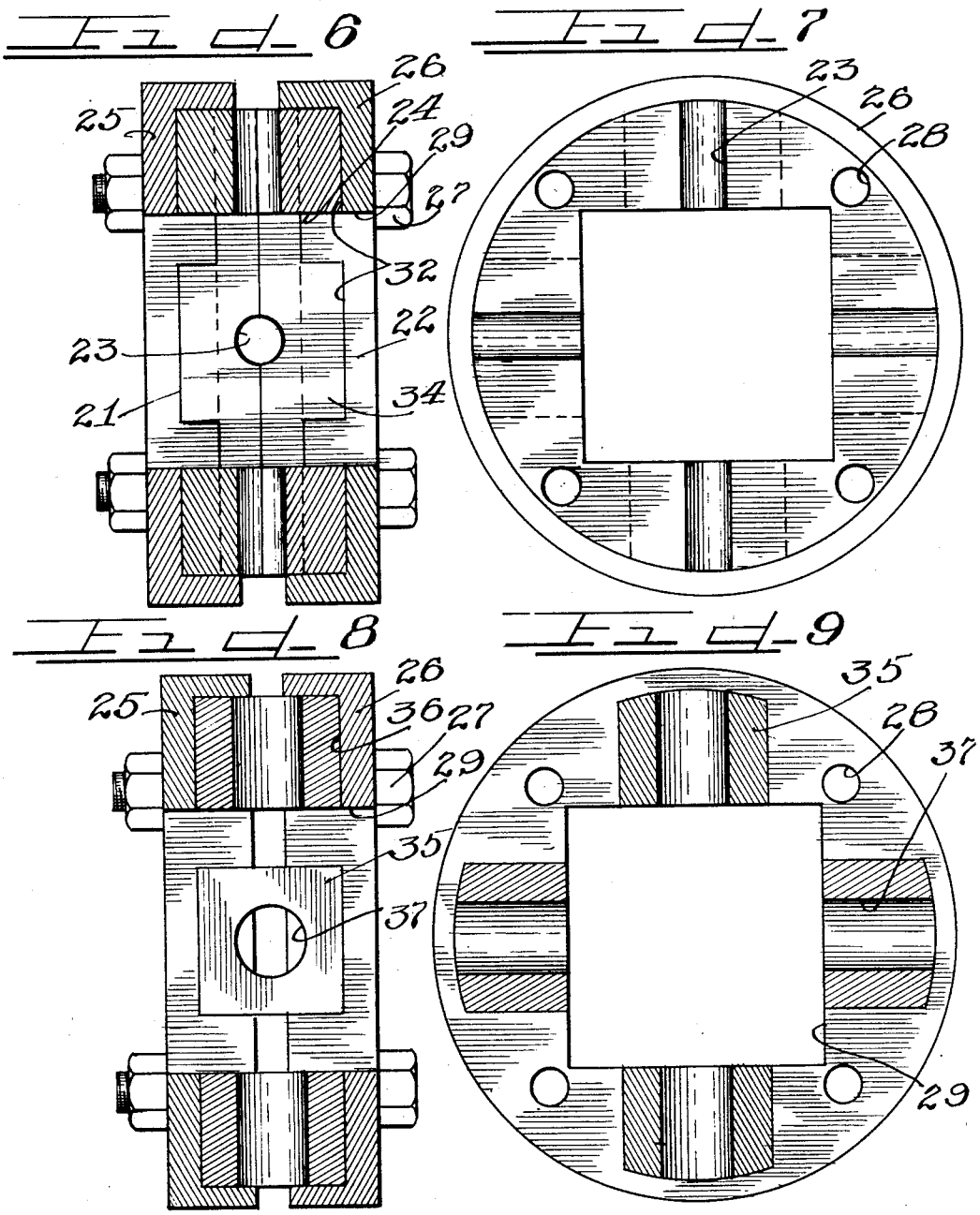

Patented Dec. 12, 1933

1,939,228

UNITED STATES PATENT OFFICE 1,939,228

UNIVERSAL JOINT

Richard Saitta, Chippewa Falls, Wis.

Application July 18, 1932. Serial No. 623,059

6 Claims. (Cl. 64—102)

This invention relates in general to a universal joint and is more particularly concerned with a joint of this character which is susceptible of use in connection with the drive shaft of an automobile. Although my improved joint is particularly useful in this connection, it will readily appear to one skilled in the art that its operating characteristics make it admirably adapted for other applications as well.

It is standard practice in the automotive industry to provide a universal joint of some type in the driving shaft. Such joints embrace various designs, but in general have been constructed with metallic parts which are in sliding engagement, for example, yoke heads which are pivotally connected to a common member. Obviously, in such an arrangement considerable friction is created between the moving parts of the joint, and it is constantly necessary to keep these parts continuously greased. Even if extreme care is taken to see that the parts are well greased, there will be considerable wear between the parts and the joints will be relatively short-lived.

The present invention seeks to overcome these as well as other objections to the present type of universal joint by providing a resilient connection between the driving and driven members of the joint, which is so arranged that friction and wear between the parts of the joint are eliminated, thereby increasing the life of the joint and making it unnecessary to grease the same.

It is a further object of the present invention to provide a greaseless universal joint which is simple in design, economical to manufacture, and longer lived than the present types of joints of this character.

It is a further object of the invention to provide a universal joint which is so constructed and designed as to make it particularly adapted for use as a replacement unit for the ordinary type of joint as now used in the automotive industry.

In accordance with the general features of this invention, I provide the usual driving and driven members, which may be in the form of yoke heads respectively connected to sections of the driving shaft, but instead of having these yokes trunnioned at right angles in a common angular metallic ring member or in a common metallic cross-shaped member, the yokes or their equivalents are provided with fixed trunnions which are either clamped between cooperating blocks of rubber or the trunnions are respectively disposed in individual blocks of rubber. In either case, the rubber should have such characteristics as to enable it to withstand the twisting forces during the operation of the joint, and the rubber should engage the trunnions sufficiently tight to prevent sliding movement between the rubber and the trunnions.

Other objects and features of this invention will more fully appear from the following detailed description taken in connection with the accompanying drawings which illustrate several embodiments thereof, and in which Figure 1 is a view in elevation showing a universal joint embodying the features of the present invention;

Figure 2 is an enlarged fragmentary sectional view showing the operative relationship between the component parts of the joint, taken substantially on line II—II of Figure 1;

Figure 3 is a transverse sectional view through the joint taken substantially on line III—III of Figure 2;

Figure 4 is an enlarged fragmentary view partly in section to show details as to the manner of assembling the joint, taken substantially on line IV—IV of Figure 3;

Figure 5 is an enlarged end view of one of the clamping members showing the rubber insert or core assembled therein;

Figure 6 is an enlarged vertical section showing the assembled relationship of the clamping rings and rubber inserts as embodied in a modified form of my invention;

Figure 7 is a view similar to Figure 5 for the modified form of my invention as shown in Figure 6;

Figure 8 is a view similar to Figure 6 for another modification of my invention; and Figure 9 is a view similar to Figure 7 for the latter modification.

In Figure 1 of the drawings, there is illustrated a preferred construction of my invention. This form of my invention is disclosed as being applied to a driving element 10 and a driven element 11. The driving element in this instance is shown as comprising a short shaft portion 12 formed with a right angled flange 13 at one end, this flange being adapted for connection to power means. The other end of the short shaft portion is provided with a cross head 14 having contracted end portions 15 and 16 forming trunnions. The driven element, which may be in the form of a shaft 17, is formed at one end into a yoke 18, the legs of this yoke having formed thereon trunnions 19 and 20.

The trunnioned end of the short shaft 12 is disposed between the two legs of the yoke 18 so that the axes of the trunnions will all lie in the same plane. Moreover, the trunnions 15 and 16 are at right angles to the trunnions 19 and 20. These trunnions are interconnected and supported by the two halves 21 and 22 of a core member which is preferably constructed of a resilient material such as rubber. The confronting surfaces of the core members 21 and 22, as shown in Figure 5, are provided with grooves 23 which are so shaped as to closely engage the outer surface of the respective trunnions. The grooves 23 at their inner ends open into a central multi-sided opening 24, in this instance, a square opening, which provides space for receiving the yoke 18 of the driven element and the short shaft 12 of the driving element.

The core members 21 and 22 are clamped against the trunnions by means of clamping members 25 and 26 which are secured together by means of through bolts 27, these bolts extending through apertures 28 in the core members. The central portion of each clamping member is provided with a corresponding opening 29 of the same shape as the opening 24 in the core members, the openings in the clamping members registering with those of the core members. The clamping members are preferably of metallic construction, and, in order to prevent relative movement between each core member and the clamping member associated therewith, a groove 30 is provided on the inner face of each clamping member. Extending into this groove is a flanged portion 31 which is integrally formed with the core member.

With the joint of my preferred form of my invention assembled as shown in Figures 1 and 2, it will be apparent that the axis of rotation of the driving element 10 may be disposed at an angle to the axis of rotation of the driven element 11, and that power may be transmitted through my improved universal joint. The construction just described, is advantageous in that there will be no friction or wear between the trunnions and the core supporting members of rubber, since the trunnions are tightly engaged by the core members and movement of the trunnions is enabled due to the inherent resiliency of the core members. Further, the core members serve to prevent vibration being set up and also produce a joint construction which is silent in operation. Since there is no friction between the moving parts of my joint and no wear, it will be apparent that lubrication of the cooperating parts will be unnecessary, thereby producing a greaseless universal joint.

The modified forms of my invention operate on the same principle as the preferred form, and differ from the preferred form only in the manner in which the core members are seated in the clamping members. Corresponding numerals have therefore been used to indicate like elements in the preferred and modified forms of my invention.

As shown in Figures 6 and 7, the clamping members instead of being provided with a continuous groove surrounding the central aperture 29 are provided with spaced recessed portions 32 for receiving similarly spaced projections 34 on the outer surface of each core member.

In the modified form of my invention, as shown in Figures 8 and 9, instead of using a pair of cooperating core members, such as 21 and 22 of the preferred form, this modified construction utilizes a separate block 35 for each of the trunnions, the ends of the blocks being disposed in aligned recesses 36 formed in the respective clamping members. Each block 35 is apertured as shown at 37 for receiving one of the trunnions. In this arrangement, the apertures 37 of the blocks should tightly fit the trunnions to prevent movement between the engaging surfaces of the trunnions and the rubber blocks, so that the movement of the trunnions may take place due to the inherent resiliency of the blocks and not on account of slippage between the trunnions and blocks.

Since the operation of the modified forms of my invention is the same as the operation of the preferred form thereof, it is not thought that it will be necessary to individually discuss the operation of the modified forms, and that their operation will be clearly understood from the more detailed description of the preferred form of my invention.

From the foregoing, it will be apparent that my invention provides an improved universal joint which is simple in design, economical to manufacture; in which the life of the parts of the joint has been increased by eliminating friction and wear; a joint which does not have to be greased; and finally, a joint which is so constructed so as to enable it to be readily used as a replacement unit in the automotive industry.

While it will be evident that the invention as heretofore described may be constructed in various ways and any material having proper characteristics may be utilized to secure a yieldable connection, it is desirable to use some material such as rubber or the like, which readily lends itself to an integral structure, either moulded in a single unit, or formed in a plurality of units.

Now, it is of course to be understood that although I have described in detail several embodiments of my invention, the invention is not to be thus limited but only insofar as defined by the scope and spirit of the appended claims.

I claim as my invention:

1. A universal joint comprising a pair of cooperative clamping members having confronting surfaces containing recessed portions, a block of yieldable material disposed between said clamping members having axially extending projecting portions extending into the recessed portions of said members, whereby said block and clamping members are retained against relative rotational movement, an element having trunnions extending into said block and adapted for connection to a driving member, an element having trunnions extending into said blocks and adapted for connection to a driven member, the trunnions of one of said elements being disposed at an angle to the trunnions of the other element, and means securing the clamping members in clamping engagement with said block.

2. A universal joint comprising a pair of cooperative clamping members having confronting surfaces containing recessed portions, a core of resilient material disposed between said clamping members having projecting end portions extending into the recessed portions of said members, whereby said core and clamping members are retained against relative rotational movement, an element having trunnions extending into said core and adapted for connection to a driving member, an element having trunnions extending into said core and adapted for connection to a driven member, the trunnions of one of said elements being disposed at an angle to the trunnions of the other element, and means securing the clamping members in clamping engagement with said core.

3. A universal joint comprising a pair of cooperative clamping members having confronting surfaces containing axially extending recessed portions, a rubber core disposed between said clamping members having projecting portions extending into the recessed portions of said members whereby said core and clamping members are retained against relative rotational movement, an element having trunnions extending into said core and adapted for connection to a driving member, an element having trunnions extending into said core and adapted for connection to a driven member, the trunnions of one of said elements being disposed at right angles to the trunnions of the other element, and means securing the clamping members in clamping engagement with said core.

4. A universal joint comprising a pair of cooperative clamping members having confronting surfaces containing recessed portions, rubber inserts extending over said confronting surfaces, each insert having portions extending into the recessed portions of its associated clamping member, whereby each insert and associated clamping member are retained against relative rotational movement, an element having trunnions extending between the rubber inserts of the clamping members and adapted for connection to a driving member, an element having trunnions extending between the rubber inserts of the clamping members and adapted for connection to a driven member, the trunnions of one element being displaced 90 degrees from the trunnions of the other element, and means securing the clamping members together with the inserts engaging said trunnions.

5. A universal joint comprising a pair of cooperative clamping members disposed in confronting relationship, each clamping member having a multi-sided central opening and having a wall conforming to the shape of said opening, a groove surrounding said opening, said grooves of the respective clamping members opening towards each other, rubber inserts respectively disposed in said grooves, an element having trunnions extending between the rubber inserts of the clamping members and adapted for connection to a driving member, another element having trunnions extending between the rubber inserts and adapted for connection to a driven member, the trunnions of one element being angularly displaced relative to the trunnions of the other element, and means securing the clamping members together with the inserts tightly engaging said trunnions.

6. A universal joint comprising a pair of spaced clamping rings disposed in end to end relationship and provided with registering grooves on their adjacent ends forming annular flanges surrounding the grooves and inwardly spaced polygonal flanges, the latter flanges defining multi-sided openings in the clamping rings in registration, a hollow core of resilient material between said clamping rings with its ends seated respectively in the grooves of said rings, a driven member extending through one of said rings into the hollow of said core, a driving member extending through the other of said rings into the hollow of said core, trunnions carried by said members supported in said core, the trunnions of one of said members being in quadrature to the trunnions of the other members, and bolts to clamp said rings and core together.

RICHARD SAITTA.